(12) United States Patent
Tsai et al.

(10) Patent No.: US 8,438,505 B2
(45) Date of Patent: May 7, 2013

(54) METHOD FOR IMPROVING ACCURACY OF PARASITICS EXTRACTION CONSIDERING SUB-WAVELENGTH LITHOGRAPHY EFFECTS

(75) Inventors: Kuen-Yu Tsai, Taipei (TW); Wei-Jhih Hsieh, New Taipei (TW); Bo-Sen Chang, Puyan Township, Changhua County (TW)

(73) Assignee: Taiwan Semicondcutor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 13/346,273

(22) Filed: Jan. 9, 2012

(65) Prior Publication Data

US 2012/0185807 A1      Jul. 19, 2012

Related U.S. Application Data

(60) Provisional application No. 61/435,050, filed on Jan. 21, 2011.

(51) Int. Cl.
*G06F 17/50*     (2006.01)

(52) U.S. Cl.
USPC ............... 716/52; 716/53; 716/54; 716/55; 716/106; 716/115

(58) Field of Classification Search ............ 716/50–56, 716/106, 108, 110–115
See application file for complete search history.

(56) References Cited

U.S. PATENT DOCUMENTS

| | | | |
|---|---|---|---|
| 7,712,068 B2 * | 5/2010 | Ren et al. | 716/55 |
| 7,765,498 B1 * | 7/2010 | Ho et al. | 716/133 |
| 7,783,999 B2 * | 8/2010 | Ou et al. | 716/136 |
| 2005/0229125 A1 * | 10/2005 | Tabery et al. | 716/5 |
| 2006/0150132 A1 * | 7/2006 | Gupta | 716/5 |
| 2007/0198967 A1 * | 8/2007 | Ren et al. | 716/21 |
| 2009/0187866 A1 * | 7/2009 | Ou et al. | 716/4 |
| 2009/0199139 A1 * | 8/2009 | White et al. | 716/4 |
| 2010/0023916 A1 * | 1/2010 | Chew et al. | 716/19 |
| 2011/0140278 A1 * | 6/2011 | Chen et al. | 257/773 |
| 2012/0144356 A1 * | 6/2012 | Banerjee et al. | 716/112 |

OTHER PUBLICATIONS

"A New Methodology for Interconnect Parasitic Extraction Considering Photo-lithography Effects", by Ying Zhou, Zhuo Li, Yuxin Tian, Weiping Shi, and Frank Liu, @2007 by IEEE.*
"A New Method to Improve Accuracy of Parasitics Extraction Considering Sub-wavelength Lithography Effects", Kuen-Yu Tsai, Wei-Jhih Hsieh, Yuan-Ching Lu, Bo-Sen Chang, Sheng-Wei Chien, and Yi-Chang Lu, Department of Electrical Engineering National Taiwan University, Jan. 21, 2010 ASPDAC (8A-3) Taipei, Taiwan.*
Kuen-Yu Tsai et al., "A New Method to Improve Accuracy of Parasitics Extraction Considering Sub-Wavelength Lithography Effects", 978-1-4244-5767-1/10/$26.00 c2010 IEEE, pp. 651-656.

* cited by examiner

*Primary Examiner* — Nha Nguyen
(74) *Attorney, Agent, or Firm* — Haynes and Boone, LLP

(57) ABSTRACT

The present disclosure involves a method. The method includes decomposing a layout of a circuit into a plurality of patterns. The method includes generating a plurality of contours to represent the plurality of patterns after the patterns have been subjected to a manufacturing process. The method includes generating a plurality of polygons that approximate geometries of the contours, respectively. The method includes associating each of the polygons with a respective one of a plurality of pattern elements in a pattern library, wherein the pattern elements each include a shape that resembles the associated polygon and electrical parameters extracted from the shape. The method includes calculating electrical performance of the circuit based on the pattern elements associated with the polygons.

19 Claims, 9 Drawing Sheets

US 8,438,505 B2

METHOD FOR IMPROVING ACCURACY OF PARASITICS EXTRACTION CONSIDERING SUB-WAVELENGTH LITHOGRAPHY EFFECTS

PRIORITY DATA

This application claims priority to Provisional Application Ser. No. 61/435,050, filed on Jan. 21, 2011, entitled "METHOD FOR IMPROVING ACCURACY OF PARASITICS EXTRACTION CONSIDERING SUB-WAVELENGTH LITHOGRAPHY EFFECTS," the entire disclosure of which is incorporated herein by reference.

BACKGROUND

The semiconductor integrated circuit (IC) industry has experienced rapid growth in recent years. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing are needed. In the course of IC evolution, functional density (i.e., the number of interconnected devices per chip area) has generally increased while geometry size (i.e., the smallest component that can be created using a fabrication process) has decreased.

Modern nanometer (nm) integrated circuits are patterned by sub-wavelength lithography with significant shape deviation from drawn layouts. Full-chip parasitics extraction faces new challenges since shape distortions such as line end rounding and corner rounding cannot be accurately characterized by existing layout parameter extraction (LPE) techniques, which assume perfect polygons.

Consequently, although existing LPE techniques have been generally adequate for their intended purposes, they have not been entirely satisfactory in all respects.

SUMMARY

One of the broader forms of the present disclosure involves a method. The method includes: providing a layout pattern; generating a contour that represents the layout pattern after the layout pattern has been subjected to a manufacturing process; generating a polygon that approximates a geometry of the contour; extracting an electrical parameter from the polygon; and building a pattern library using the polygon and the electrical parameter.

Another one of the broader forms of the present disclosure involves a method. The method includes: decomposing a layout of a circuit into a plurality of patterns; generating a plurality of contours to represent the plurality of patterns after the patterns have been subjected to a manufacturing process; generating a plurality of polygons that approximate geometries of the contours, respectively; associating each of the polygons with a respective one of a plurality of pattern elements in a pattern library, wherein the pattern elements each include a shape that resembles the associated polygon and electrical parameters extracted from the shape; and calculating electrical performance of the circuit based on the pattern elements associated with the polygons.

Yet another one of the broader forms of the present disclosure involves a method. The method includes: receiving a plurality of layout patterns; generating a plurality of contours through a resolution-enhancement-technique (RET) simulation process to represent proximity effects of a manufacturing process with respect to the plurality of layout patterns; generating a plurality of polygons that approximate geometries of the contours, respectively; extracting a plurality of electrical parameters based on the polygons; establishing a library that contains a plurality of pattern elements, wherein each pattern element corresponds to at least one of the polygons and at least one of the electrical parameters; receiving a full-chip layout; decomposing the full-chip layout into a plurality of sub-units that each correspond to a respective one of the pattern elements in the library; and simulating full-chip electrical parasitic behavior, wherein the simulating includes using the library to calculate electrical parasitic parameters of the sub-units and determining the full-chip electrical parasitic behavior based on the calculated results of the electrical parameters of the sub-units.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
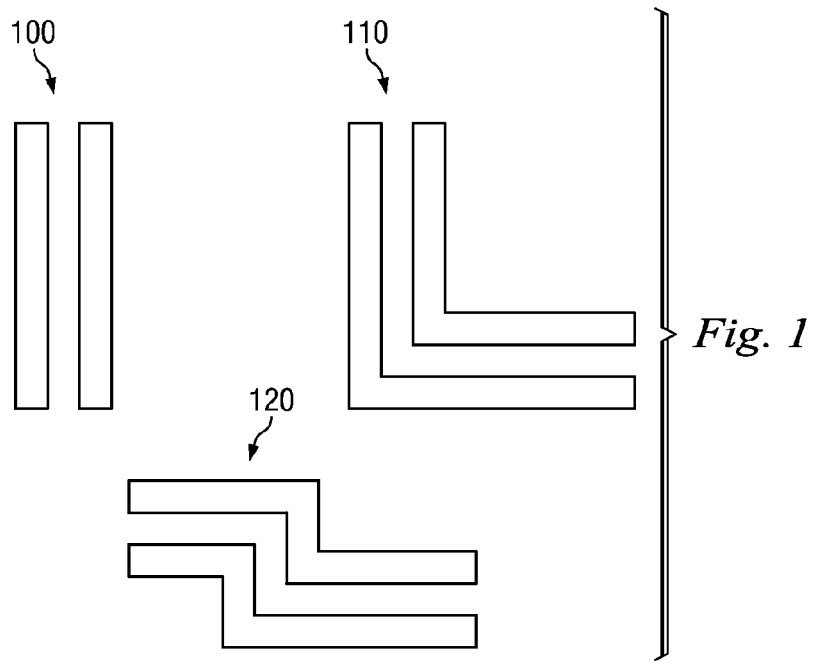
FIG. 1 is a top view of an ideal drawn layout of several example layout patterns.

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

I. INTRODUCTION

Proper electrical performances of integrated circuits depend on effective dimension control by manufacturing. The shape of integrated circuits is primarily determined by patterning fidelity of lithography processes. Due to diffraction, the minimum half-pitch resolvable for optical projection lithography is described by the Rayleigh equation $k_1 * \lambda / NA$, where $\lambda$ is the exposure wavelength, NA is the numerical aperture, and $k_1$ is a process-dependent factor. A smaller $k_1$ indicates higher process complexity and difficulty. The exposure wavelength may be maintained at 193 nm for several generations beyond the 90-nm half-pitch node due to technical difficulties encountered with further wavelength reduction. NA will likely not be significantly increased either, after the introduction of immersion lithography. For these reasons, shape distortions from designed layout geometry will become quite significant due to strong sub-wavelength effects.

These shape distortions may include line end shortening, line width variation, line end rounding, and corner rounding. Line end shortening and line width variations refer to changes in the length or the width of a feature, which typically does not change the overall shape of the feature very much. In other words, a rectangular feature may still appear as a rectangular feature, albeit with longer/shorter or wider/thinner dimensions. On the other hand, line end rounding and corner rounding distortions relate to changes in actual shapes of the original layout feature. For example, a rectangular layout feature may have curved or rounded edges after manufacturing, when these edges are supposed to be rectangular.

Various lithography resolution enhancement techniques (RETs) may be used to compensate for shape distortions. For example, model-based optical proximity correction (OPC) methods may be implemented as a form of RET, which iteratively adjusts fragmented edge segments of drawn layouts to compensate for predictable lithography distortions. However, due to limitation of correction effectiveness, line width variation and line end shortening effects are usually better compensated than line end rounding and corner rounding effects. For example, even with a fine OPC fragmentation setting, it may be difficult to eliminate the rounding distortion effects.

Electrical performances of manufactured transistors (such as field effect transistors) and interconnect structures (including metal interconnect lines and vias) can deviate significantly from original design due to the limitations of RET compensation effectiveness. Impacts of lithography patterning fidelity on transistor performances have been intensively studied. Less has been done for interconnect structures. However, in the nanometer regime, interconnect structures may play an increasingly significant role that impacts overall circuit performance. Since three-dimensional control of interconnect structures is one of the more difficult near-term and long-term technology challenges due to various process-related effects, faithful extraction of interconnect parasitic parameters considering process-induced geometric distortions is important to the accuracy of post-layout circuit simulation, which is a critical step in design closure.

State-of-the-art 3D electrometric field solvers can accurately extract parasitic parameters for complicated interconnect shapes by simulating detailed electromagnetic field distribution with various numerical methods. Since speed and memory requirements limit the usage of 3D field solvers to small-scale layouts, full-chip parasitics extraction is accomplished by efficient layout parameter extraction (LPE) techniques based on library pattern matching and table lookup. The library is pre-characterized by test structure measurement or field solver simulation. Large-scale layouts are decomposed to smaller regions to match with the pattern-to-parasitics library. However, existing LPE tools deal with layout geometry based on substantially perfectly-shaped polygons, for example, substantially perfectly-shaped rectangles, squares, etc. Thus, the extraction accuracy is limited if the shapes of fabricated circuits deviate significantly from perfect polygons. Manhattan layouts are the most typical or common circuit layouts. A Manhattan layout involves layout features or patterns that have straight and orthogonal edges. The layout features also extend either horizontally or vertically.

Several methods discussed below may be used to enhance LPE accuracy against shape distortions. For example, post-RET contours can be divided into multiple rectangular segments such that electrical parameters can be summed up by a table lookup. As another example, a delta-segment compensation method may be used to compensate for the RLC (resistor-inductor-capacitor) mismatch error caused by process effects. As yet another example, lithography simulation and shape correction (SC) steps are inserted into the standard library generation flow to compensate for impacts of lithography effects on parasitics parameters. Shape correction applies edge biases to drawn polygons to match lithography contours. Nevertheless, although parasitics deviation due to line end shortening and line width variation can be well-compensated by edge biasing, it may not effectively deal with line end rounding and corner rounding distortions from the drawn polygons. Furthermore, lithography interaction between patterns in large-scale layouts is ignored by the proposed LPE flow of the shape correction method.

According to the various aspects of the present disclosure, a new method is proposed to deal with various sub-wavelength lithography effects to further improve LPE accuracy. In particular, it is effective in dealing with severe line end rounding and corner rounding distortions. Influence of corner rounding distortions on interconnect parasitics is investigated in Section II. A new RET-aware LPE flow is proposed in section III. A novel shape approximation (SA) methodology (which is utilized in the new RET-aware LPE process flow of section III) is discussed in section IV. Preliminary simulation and verification results of several test patterns utilizing SA and 3D field solver simulation are shown in section V. Section VI includes a summary of the previous sections.

II. IMPACTS OF PATTERN ROUNDING ON PARASITICS

Projection lenses used in optical lithography are effectively low-pass imaging filters which transform ideal drawn circuit layouts to distorted wafer patterns. Shape distortions and corresponding parasitic values of various layout patterns can be accurately predicted by calibrated lithography and field-solver simulation. Since line end shortening and line width variation can be better compensated by OPC, the challenge is to accurately characterize the parasitics effects contributed by line end rounding and corner rounding issues.

Figure 2:
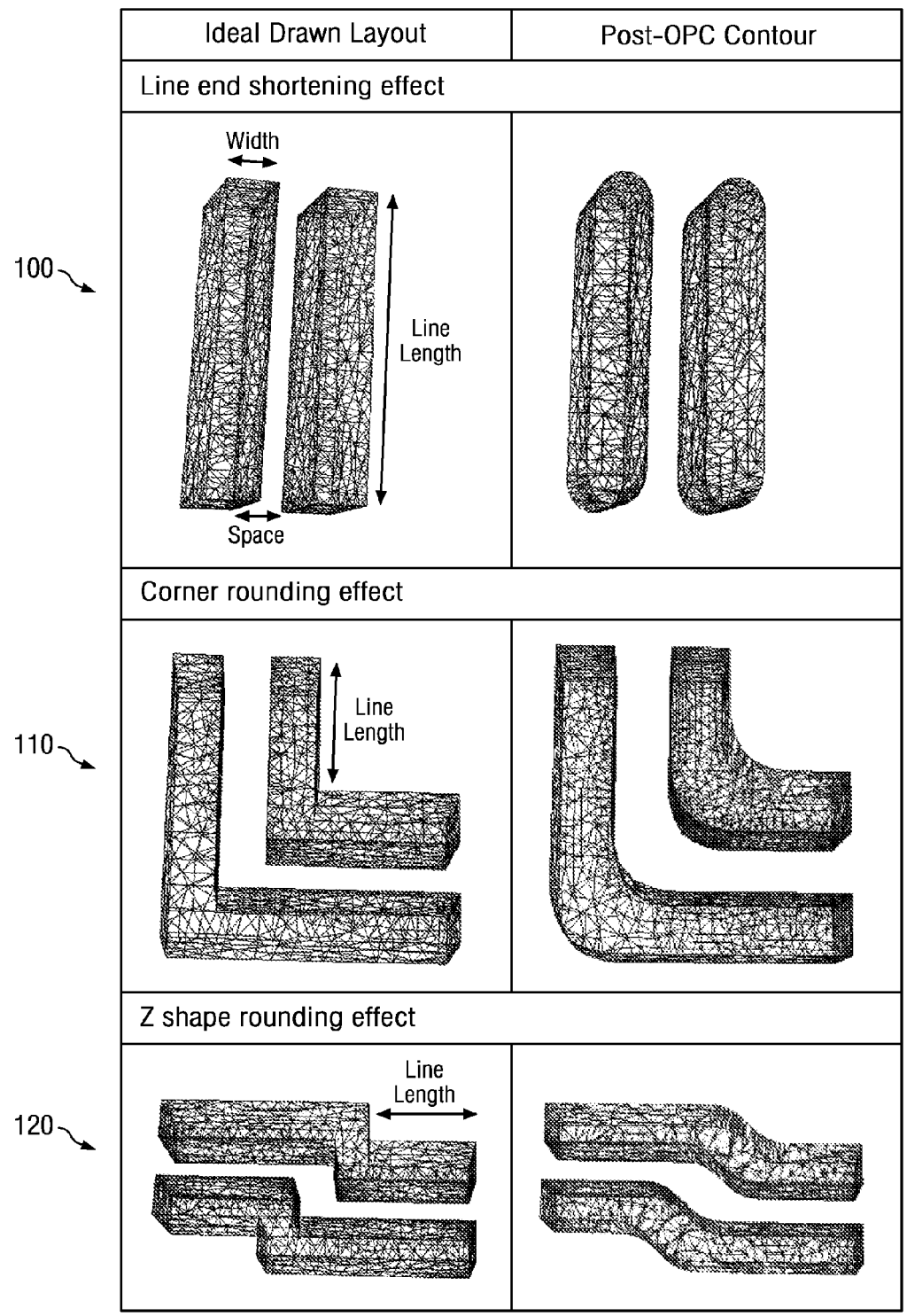
FIG. 2 is a side-by-side comparison of example 3D structures corresponding to their ideal layout patterns and their respective post-optical-proximity-correction (OPC) contours.

To facilitate the discussions of shape distortion, three simple types of patterns are used herein as examples. Referring to FIG. 1, these patterns include parallel lines 100, parallel L-shaped lines 110, and parallel Z-shaped lines 120. Complicated layouts can be constructed from these simple patterns shown in FIG. 1. Also, the patterns shown in FIG. 1 represent ideal layout patterns (also referred to as drawn layouts), and they are susceptible to various distortions in real fabrication processes, such as line length/width variations and/or rounding effects. To alleviate these distortions, optical proximity correction (OPC) features (not shown herein) may be added to generate contours that are closer in shape to the ideal layout patterns. However, even after OPC, the fabricated contours may still deviate from their respective ideal layout patterns. This is shown in FIG. 2, which compares the ideal layout patterns 110-130 side-by-side with their respective post-OPC contours in perspective views. The distortion issues of each of the patterns 110-130 are discussed below.

A. Line End Rounding and Shortening of Parallel Lines

Line end shortening and rounding in interconnect layers not only causes circuit performance variation but can also lead to catastrophic defects such as circuit opens and shorts. By considering OPC, relative coupling capacitance extraction errors may range between 6% and 3%, and relative resistance errors may range between 4.4% and 5%.

B. Corner Rounding of Parallel L-shaped Lines

Corner rounding is effectively a 2D lithography effect. By considering OPC, relative coupling capacitance extraction errors may range between 4% and 2.6%, and relative resistance errors may range between 4.8% and 2%.

C. Corner Rounding of Parallel Z-shaped Lines

Z-shaped features can be found in many layouts produced by automatic placement and routing tools. Although a Z-shape feature can be formed by connecting two L-shaped features, as the two corners are getting close, severe lithography distortion prevents it from being treated as two independent L-shaped features. By considering OPC, relative coupling capacitance extraction errors may range between 4.8% and 3%, and relative resistance errors may range between 6% and 3.3%.

The general trend of the reduction of relative capacitance and resistance deviation with respect to line length increase is intuitive, since longer wires are less affected by line end rounding and corner rounding. The shapes of global interconnect structures are less affected by sub-wavelength effects due to their larger dimensions. Impacts of rounding and shortening distortions on their capacitance and resistance are relatively small. It is expected that RC delay of integrated circuits is not sensitive to lithography distortions since it is dominated by global interconnects. However, for local interconnects, the differences caused by rounding and shortening distortions can no longer be ignored. They may cause timing problems as well as lower noise margins. For example, it is expected that crosstalk noise through capacitive coupling in local and intermediate interconnects is affected by rounding effects. The effect is increasingly important with technology scaling. Hence, the present disclosure proposes methods that effectively solve the distortion issues associated with local interconnects, as discussed below.

III. A NOVEL MODEL-BASED RET-AWARE LPE METHOD

For nanometer circuit designers to extract maximum performance, interconnect structures cannot tolerate variability in profiles without producing undesirable RC degradation. They should have full parasitic information of designed circuit layouts. A shape correction (SC) technique has been proposed to help circuit designers deal with these issues. The SC technique applies edge biases to the drawn layouts in order to approximate the contours. The SC technique can be somewhat effective with respect to line end shortening and line width variation effects, but it still suffers from some shortcomings. For example, lithography proximity effects between adjacent layout patterns in the large-scale circuit are ignored by the SC technique. In addition, severe line end rounding and corner rounding cannot be approximated well by the SC technique. These shortcomings may be even more pronounced with respect to complicated layouts with strong sub-wavelength lithography effects.

Figure 3:
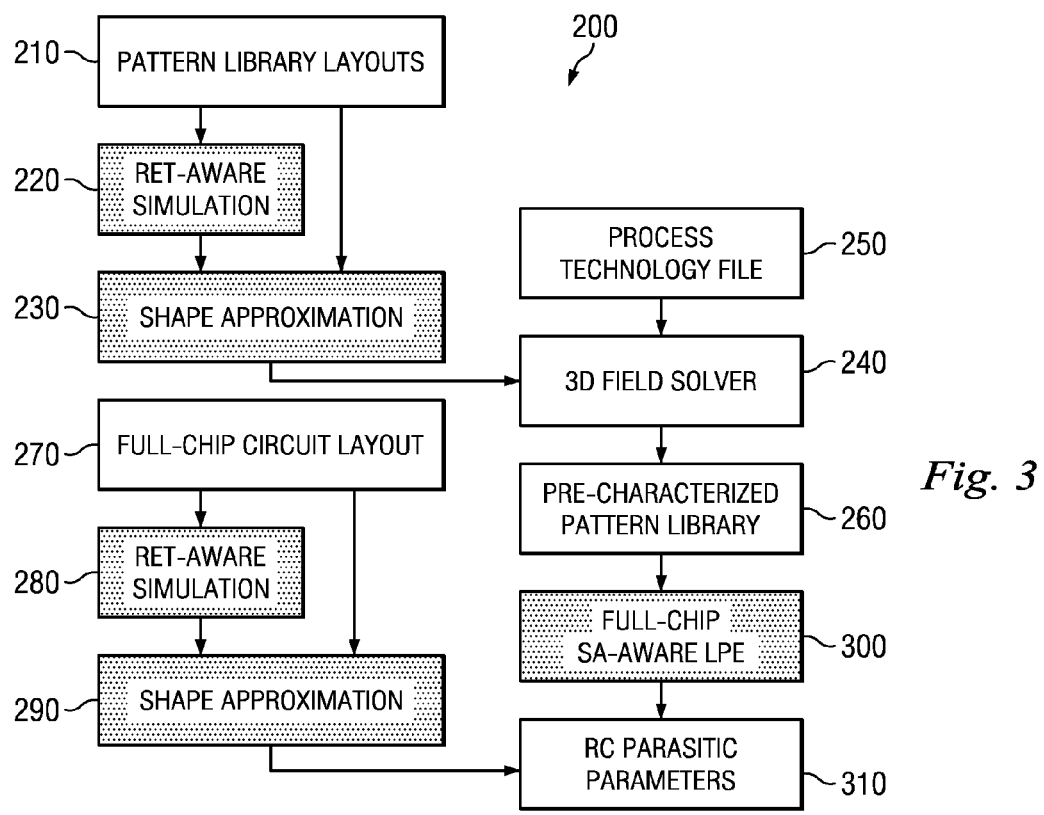
FIG. 3 is a flowchart illustrating a layout parameter extraction (LPE) flow that utilizes a shape approximation technique according to various aspects of the present disclosure.

In comparison, the present disclosure offers a new model-based RET-aware LPE flow 200 as shown in FIG. 3. Referring to FIG. 3, the LPE flow 200 begins with block 210, in which a set of pattern library layouts is generated. In more detail, a circuit layout may be the layout for an entire integrated circuit (IC) chip, which may include millions or billions of IC components such as transistors, capacitors, resistors, or inductors. The circuit layout is decomposed into a plurality of pattern library layouts, where the pattern library layouts may include patterns similar to the patterns 100-120 discussed above with reference to FIGS. 1-2.

The LPE flow 200 continues with block 220, in which an RET-aware simulation is performed. As discussed above, RET refers to procedures that help reduce the difference between shapes of drawn layouts and actual shapes of fabricated patterns. Stated differently, RET assumes that actual shapes of fabricated patterns will deviate from ideal drawn layout patterns. To minimize the amount of deviation, RET makes adjustments to masks or to the lithography process accordingly. In an embodiment, RET includes an OPC technique. In another embodiment, RET may include an etching process bias. Lithography simulation is utilized to generate post-RET contours of drawn layouts of the predefined pattern library. It is understood that the RET-aware simulation is only one type of shape distortion process simulation, and that the simulation in block 220 may contain any other shape-distortion process simulations in alternative embodiments.

The LPE flow 200 continues with block 230 in which post-RET contours are approximated by a shape approximation (SA) technique. The SA technique modifies the polygons of the drawn layouts to better approximate rounding effects. For example, a drawn Manhattan layout (also referred to as orthogonal layout) may have non-Manhattan features after SA. For one pair of parallel L-shaped lines, post-RET contours with corner rounding can be approximated by one pair of 0-degree parallel lines, one pair of 45-degree parallel lines, and one pair of 90-degree parallel lines. Details of SA are further explained in section IV below.

The LPE flow 200 continues with block 240 in which an RET-aware pattern library is generated by a 3D field solver simulation of the SA-simplified structures. These structures help reduce mesh complexity for field solver simulation, and their sizes with the SA-modified polygons can be parameterized effectively for a subsequent full-chip LPE operation discussed below. The 3D field solve simulation involves using Maxwell's equations to calculate electromagnetic fields based on physical geometries of the SA-modified polygons, and then utilizing the electromagnetic fields to calculate the corresponding electrical parameters such as parasitic capacitance, resistance, and/or inductance. In this manner, electrical parameters of the SA-modified patterns are obtained. It is understood that for the 3D field solver to work accurately and effectively, the process technology files (from the corresponding fabrication process technology) may be provided in block 250. The process technology files may be provided by a manufacturer.

The LPE flow 200 continues with block 260 in which a pre-characterized pattern library is constructed. The pre-characterized pattern library may include a table comprising the electrical parameter values obtained by block 240. In an embodiment, the table may include a column that lists all the SA-approximated patterns, and a plurality of additional columns that each list the respective values of one of a plurality of electrical parameters. For example, one column may list the values of parasitic capacitance, another column may list the values of parasitic resistance, and yet another column may list the values of parasitic inductance, wherein each row of the table may correspond to a different pattern in the pattern library.

So far, blocks 210-260 of the LPE flow 200 involve a process to build or establish a pattern library that includes SA-approximated patterns and their corresponding electrical parameters. The remaining blocks of the LPE flow 200 discussed below involve performing an IC process for a specific IC design using the pattern library established in blocks 210-260 above.

In block 270, a full-chip circuit layout is provided. This full-chip circuit layout may be generated at the design stage of an IC chip. The full-chip circuit layout may be decomposed into a plurality of sub-units that each contain a shape resembling one of the pattern elements. The LPE flow 200 then continues with block 280, in which an RET-aware simulation is performed. In order to take the proximity effects (between adjacent layout patterns) into account, the RET-aware simulation here takes into account of the entire full-chip circuit layout. The post-RET contours of each sub-unit can then be extracted from the RET-aware simulation of the entire full-chip circuit layout. It is understood that the RET-aware simulation is only one type of shape distortion process simulation, and that the simulation in block 280 may contain any other shape-distortion process simulations in alternative embodiments.

The LPE flow 200 continues with block 290, in which a shape-approximation process similar to that of block 230 is performed on the post-RET contours obtained from block 280. Thereafter, to accurately quantify proximity effects under sub-wavelength lithography, a full-chip SA-aware LPE process is performed in block 300. The full-chip SA-aware LPE process is performed in response to the RET simulation performed in block 280 and the shape-approximation process performed in block 290. In particular, the sub-units of the decomposed full-chip circuit layout may each be associated with one of the pattern elements in the pattern library based on similarity in shape/geometry. Thus, the electrical parameters already stored in the library for that pattern element may be used to calculate the electrical characteristics of the decomposed sub-units. Afterwards, the LPE flow 200 proceeds to block 310 in which electrical parameters such as parasitic capacitance and parasitic resistance values are extracted for the full-chip layout. In the process discussed above, the full-chip electrical parameters are calculated as a function of the electrical parameters of the pattern elements of the library.

In the manner described above, layout decomposition and pattern matching can be done with the original drawn layouts for simplification. However, table lookup is based on comparing post-RET SA-corrected layouts. Standard LPE techniques can be extended to handle non-Manhattan features to be compatible with SA for full-chip extraction. The exponential growth of table size with number of variables can be alleviated by first partitioning the layouts to distribute the SA variables to several tables and then combining the parasitic values. The details are not discussed herein for the sake of simplicity. When the pattern library is characterized by test structure measurement instead of field solver simulation, the post-RET simulation is replaced by standard manufacturing processes and contour measurement of fabricated patterns. The LPE flow 200 can be easily implemented by combining existing tools and SA algorithms discussed below.

IV. SHAPE APPROXIMATION

Shape approximation is an important step for both the pattern library generation and the full-chip extraction in the proposed RET-aware LPE flow 200. Shape approximation is a method to approximate post-RET contours by first patching the drawn layouts with new features at locations with significant shape distortions (such as curved edges), and then adjusting the dimension of the patched layouts such that the contours are optimally matched. The former process is referred as shape transformation, and the later process is referred to as shape adjustment. Shape transformation can be either rule-based or model-based. In the rule-based approach, features prone to lithography distortion are pre-characterized, identified from drawn layouts, and patched. In the model-based approach, patch locations are determined from the deviation of post-RET contours from drawn layouts. Algorithms developed for determining the insertion locations of sub-resolution assist features (e.g., hammer heads and scattering bars) by either rule-based or model-based approaches can also be utilized.

The optimal shape adjustment problem can be formulated and solved in several ways. For example, algorithms used to iteratively move model-based OPC segments according to edge placement errors can be utilized to adjust the sizes of the patched layouts. The difference is that in OPC the contours need to be updated by lithography simulation during each iteration, whereas the post-RET contours are fixed in shape adjustment. There is no need to update lithography contours during iteration, and there is no lithography interaction between adjacent segments. Therefore the computation complexity is lower, and the adjustment requires fewer iterations for convergence.

Figure 4:
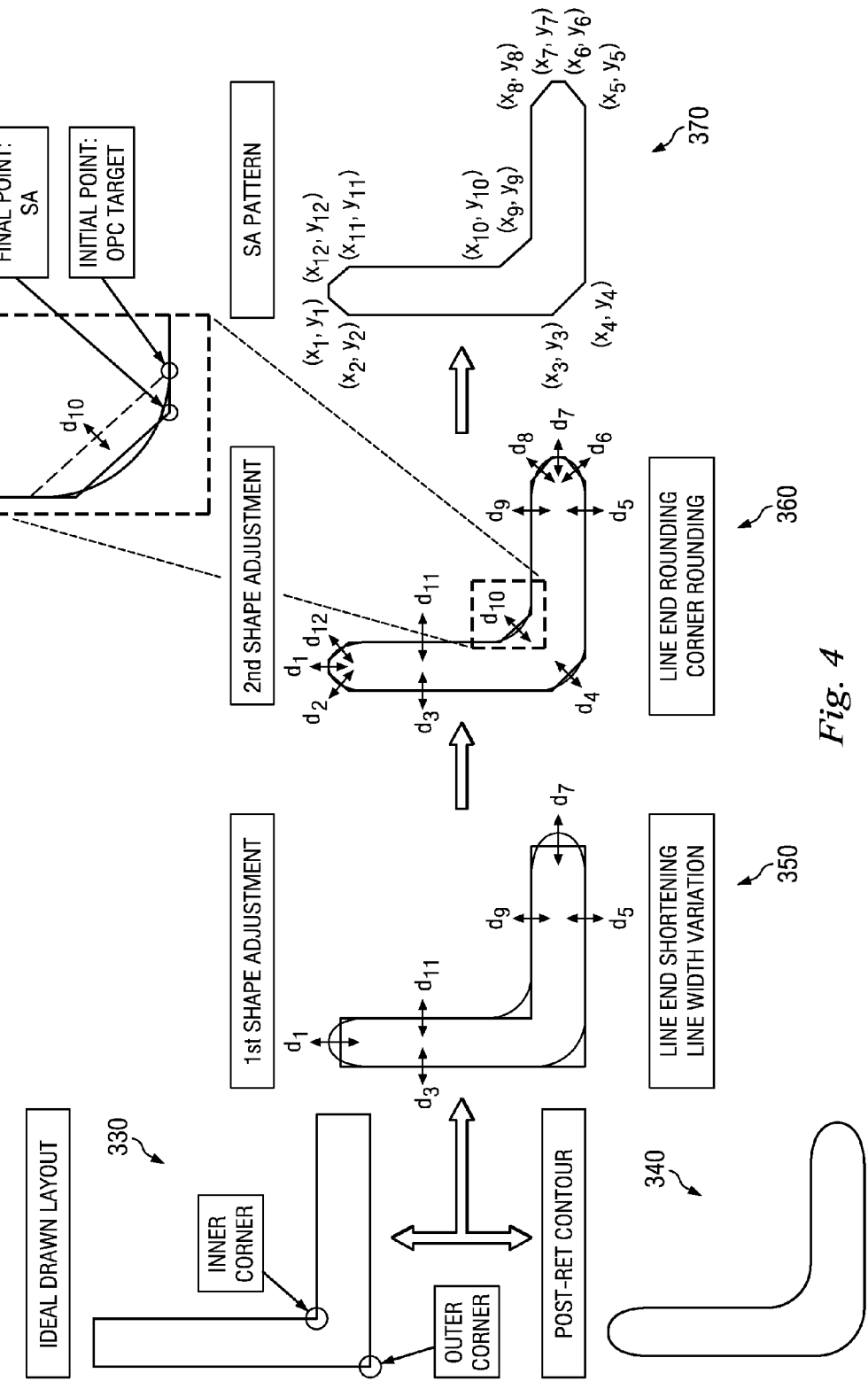
FIG. 4 is a heuristic two-step shape adjustment algorithm that is an embodiment of the shape approximation technique.

FIG. 4 illustrates a heuristic two-step shape approximation or shape adjustment algorithm. As an example, FIG. 4 demonstrates how to approximate post-RET contours of parallel L-shaped lines to patched layouts consisting of simple 0-45-90-degree features with a sub-optimal heuristic method. As is shown in FIG. 4, an ideal drawn layout 330 of parallel L-shaped lines has a corresponding post-RET contour 340. The ideal drawn layout 330 has Manhattan geometry. In comparison, the post-RET contour 340 has non-Manhattan geometry. For example, at the line end portions (the tip portions) of the post-RET contour 340, the edges are curved or rounded. The shape approximation algorithm aims to approximate these curved or rounded portions with multiple sides of polygons.

In more detail, the shape approximation is done in two main steps with intention to reduce the interaction between decision variables. The first step 350 (refer to $1^{st}$ Shape Adjustment in FIG. 4) is done before shape transformation. It provides initial compensation for line end shortening and line width variation by adjusting the sizes of the drawn layouts to match the post-RET contours. Here, for the single L-shaped line, both the post-RET contour 340 and the drawn layout 330 being adjusted are converted to binary matrices representing their discretized shape distribution. Square of Frobenius matrix norm of the error matrix is selected as the cost function, which is defined as the squared sum of the error matrix elements. Least-square method is used to determine the optimal edge bias values $d1$, $d3$, $d5$, $d7$, $d9$, and $d11$.

The second step 360 (refer to $2^{nd}$ Shape Adjustment in FIG. 4) provides compensation for line end rounding and corner rounding to generate high-fidelity approximation to post-RET contours such as the contour 340. Layout locations with severe rounding effects are patched to include oblique edges. For the L-shaped layout, one 45-degree patch is added to, and the other subtracted from, the inner corner and the outer corner, respectively. Two 45-degree patches are subtracted from each of the line ends. Initial edge locations of the patches can be determined from a pre-characterized lookup table or target points specified on the post-RET contour 340. In this step, edge biasing values of the patches, $d2$, $d4$, $d6$, $d8$, $d10$, and $d12$ can be determined sequentially, similar to how edge segments are adjusted in some OPC algorithms. After the second step 360 is performed, a shape-approximated (SA) pattern 370 is obtained, which is a polygon that resembles the geometry of the Post-RET contour 340. It can be seen that the SA pattern 370 also has a non-Manhattan shape, since its edges are non-orthogonal.

Figure 5:
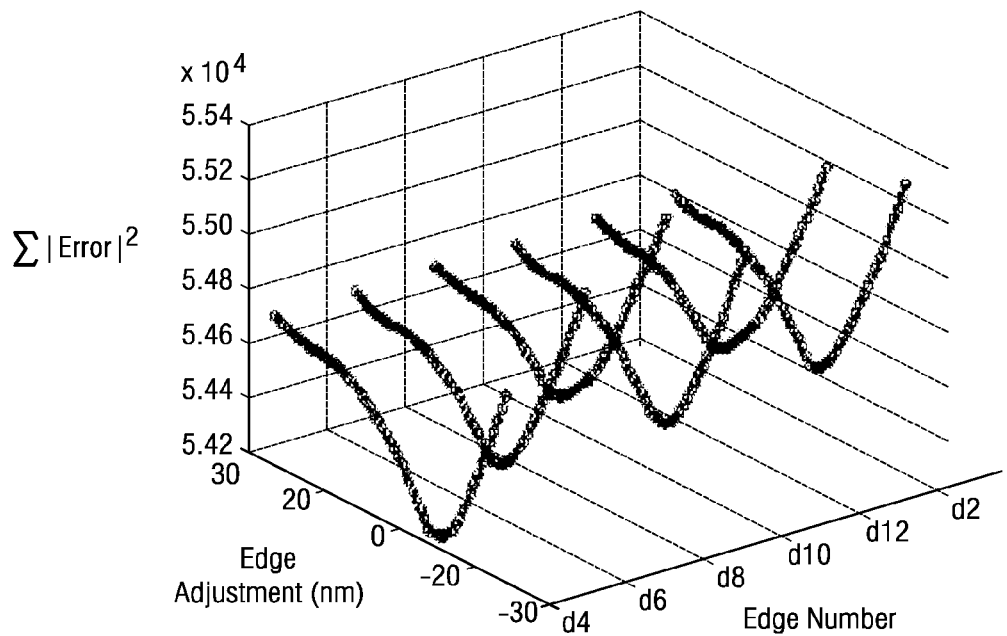
FIG. 5 is a cost function plot V.S. individual edge adjustments involving the shape approximation technique.
Figure 5:
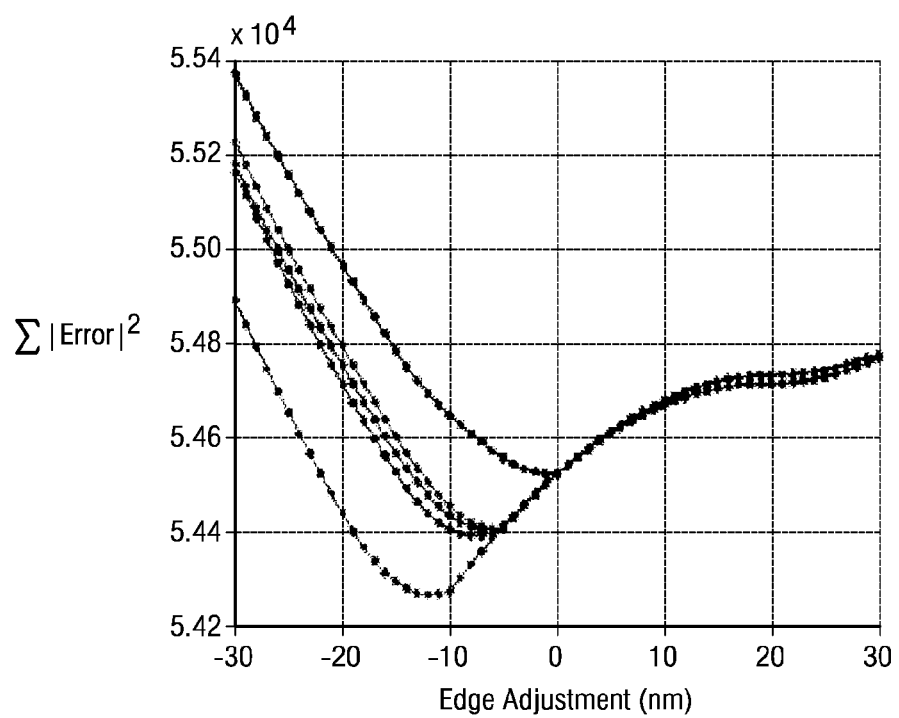

For the second step 360, the same binary matrices and cost function are defined as in the first step. A combined cost function plot versus each of the decision variables while keeping others fixed at zero is illustrated in FIG. 5, which shows a cost function plot V.S. each individual edge adjustment. It is found that each one-variable cost function plot has a continuous quasiconvex shape. It implies that each one-variable cost function has a minimum value. For values smaller than the minimum value, the cost function is non-increasing, and for values larger it is non-decreasing. The minimum value of each one-variable quasiconvex function can be found efficiently by bi-section search for value where the gradient changes its sign. Overall, the increased computation complexity of SA over SC is manageable. In addition, by applying shape transformation only at layout locations with severe lithography distortions and utilizing efficient shape adjustment algorithms, the run time impact on full-chip parasitics extraction can be minimized.

V. PARASITICS EXTRACTION WITH SHAPE APPROXIMATION

To evaluate accuracy improvement in parasitics extraction contributed by shape approximation, several different types of layout patterns are investigated through simulations. In the simulations, the test patterns follow a set of 45-nm technology design rules where the minimum pitch of the metal-1 layer is 130 nm. Contours of wafer patterns are generated by OPC simulation. Lithography process parameters are selected based on the ITRS 65-nm half-pitch node, where $\lambda$ is 193 nm and NA is 1.2 with water immersion lens, such that $k_1$ equals to 0.404. Annular illumination is selected with an outer illumination NA of 0.735 and an inner illumination NA of 0.514, such that the theoretical $k_1$ is 0.31 which is equated from $0.5/(1+\sigma)$ where the partial coherence factor $\sigma$ is the ratio between the outer illumination NA and the lens NA. Ten kernel functions are used to accelerate the lithography simulation. The OPC segment adjustment is stopped after 15 iterations. Also in the simulation, line width and line space are both fixed at 65 nm, and line length varies from two metal-1 pitches (260 nm) to five metal-1 pitches (650 nm), which are typical values in standard cells using 45-nm technology.

To focus on main lithography effects, resist profiles and etch processes are assumed to be ideal. Three-dimensional structures are generated by extruding the post-OPC contours with a height of 130 nm which is the copper thickness of the metal-1 layer, on a silicon substrate of 1 um (micron), with insulator oxide layers of 85 nm and 120 nm below and above the metal layer. The values of thickness, sheet resistance, and permittivity follow FreePDK45. In order to isolate the effects due to corner rounding for the parallel L-shaped and Z-shaped lines, contours at regions with line-end rounding and shortening are flattened.

Resistance and capacitance values of the 3D structures with various dimensions from 2 to 5 metal-1 pitches (P) are extracted by a 3D field solver and are summarized in the "OPC" and "Ideal" columns of the tables listed below. All the relative extraction errors discussed herein are based on the post-OPC values.

TABLE 1

Capacitance and Resistance of Parallel I-shaped Lines

| Length (P) | Capacitance ($\times 10^{-16}$ F) | | | | Resistance ($\Omega$) | | | |
|---|---|---|---|---|---|---|---|---|
| | OPC | Ideal (%) | SC (%) | SA (%) | OPC | Ideal (%) | SC (%) | SA (%) |
| 2 | 0.22 | 5.6 | 1.86 | 0.94 | 0.50 | 4.58 | 1.56 | 0.93 |
| 2.5 | 0.28 | 5.45 | 1.92 | 0.73 | 0.63 | 5.48 | 2.19 | 0.27 |
| 3 | 0.32 | 4.41 | 1.57 | 0.85 | 0.76 | 4.82 | 2.13 | 0.98 |
| 3.5 | 0.37 | 4.76 | 1.23 | 0.42 | 0.90 | 4.13 | 1.84 | 0.91 |
| 4 | 0.42 | 3.71 | 1.67 | −0.64 | 1.03 | 4.46 | 2.45 | 0.73 |
| 4.5 | 0.49 | 3.84 | 1.42 | −0.88 | 1.16 | 4.65 | 2.85 | 0.89 |
| 5 | 0.52 | 2.94 | 1.34 | −0.22 | 1.29 | 4.63 | 3.02 | 0.81 |

TABLE 2

Capacitance and Resistance of Parallel L-shaped Lines

| Length (P) | Capacitance ($\times 10^{-16}$ F) | | | | Resistance ($\Omega$) | | | |
|---|---|---|---|---|---|---|---|---|
| | OPC | Ideal (%) | SC (%) | SA (%) | OPC | Ideal (%) | SC (%) | SA (%) |
| 2 | 0.56 | 4.12 | 4.12 | 0.01 | 1.06 | 4.84 | 4.84 | 0.95 |
| 2.5 | 0.67 | 4.18 | 4.18 | 0.29 | 1.32 | 3.78 | 3.78 | 0.52 |
| 3 | 0.80 | 2.61 | 2.61 | 0.25 | 1.59 | 3.02 | 3.02 | 0.41 |
| 3.5 | 0.90 | 3.17 | 3.17 | 0.36 | 1.85 | 2.77 | 2.77 | 0.61 |
| 4 | 1.02 | 2.49 | 2.49 | 0.15 | 2.10 | 2.48 | 2.48 | 0.38 |
| 4.5 | 1.12 | 2.78 | 2.78 | 0.11 | 2.38 | 2.05 | 2.05 | 0.45 |
| 5 | 1.24 | 2.57 | 2.57 | 0.22 | 2.64 | 1.94 | 1.94 | 0.35 |

TABLE 3

Capacitance and Resistance of Parallel Z-shaped Lines

| Length (P) | Capacitance ($\times 10^{-16}$ F) | | | | Resistance ($\Omega$) | | | |
|---|---|---|---|---|---|---|---|---|
| | OPC | Ideal (%) | SC (%) | SA (%) | OPC | Ideal (%) | SC (%) | SA (%) |
| 2 | 0.54 | 4.77 | 4.77 | −0.5 | 1.26 | 6.12 | 6.12 | 1.21 |
| 2.5 | 0.65 | 5.18 | 5.18 | −1.21 | 1.52 | 5.89 | 5.89 | 1.01 |
| 3 | 0.77 | 3.34 | 3.34 | −0.76 | 1.77 | 5.44 | 5.44 | 0.87 |
| 3.5 | 0.87 | 4.43 | 4.43 | −0.96 | 2.05 | 4.62 | 4.62 | 0.75 |
| 4 | 0.98 | 3.59 | 3.59 | −0.78 | 2.29 | 4.63 | 4.63 | 0.76 |
| 4.5 | 1.09 | 3.65 | 3.65 | −0.87 | 2.57 | 3.51 | 3.51 | 0.94 |
| 5 | 1.21 | 3.13 | 3.13 | −0.44 | 2.78 | 3.28 | 3.28 | 0.62 |

A. Accuracy Improvement in Pattern Rounding

Figure 6:
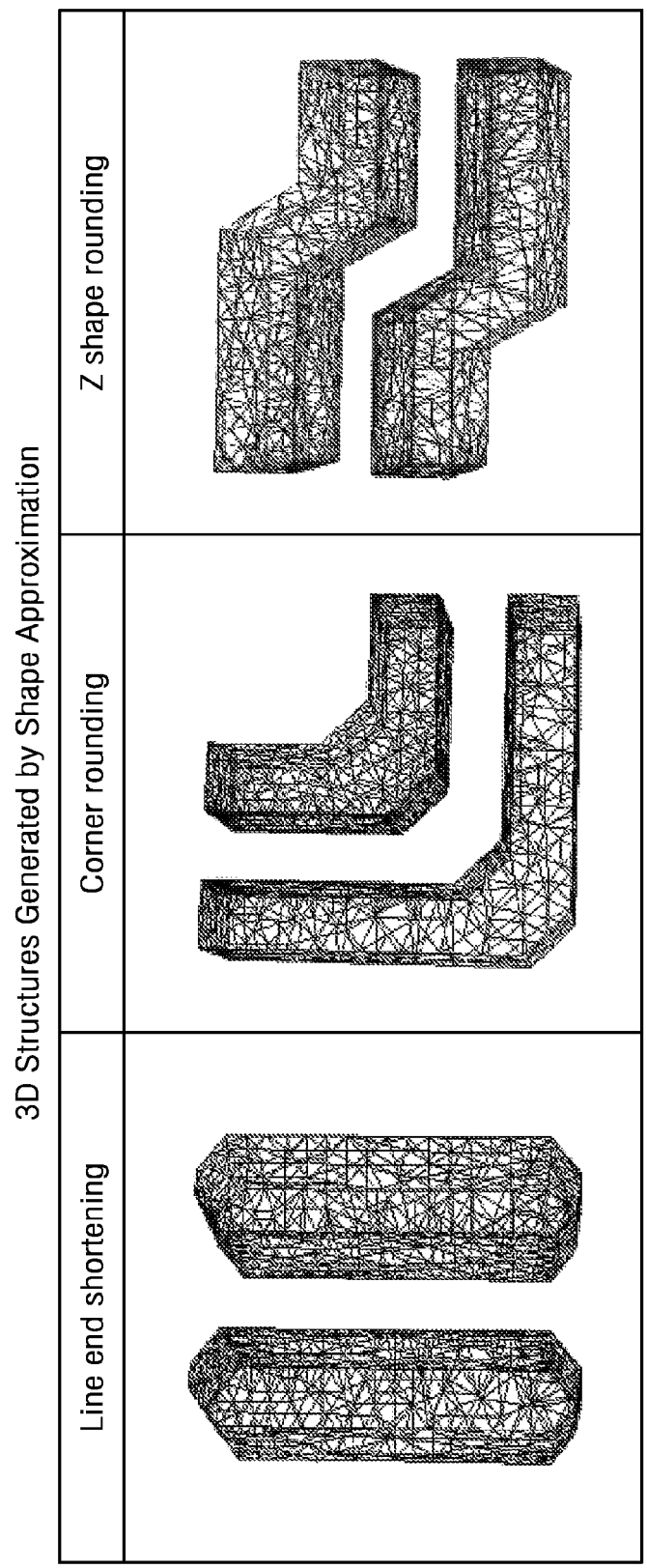
FIG. 6 is a view of three-dimensional structures of the example layout patterns generated by the shape approximation technique.

The two-step shape approximation algorithm described in section IV is applied to the three layouts patterns discussed above—parallel I-shaped lines, parallel L-shaped lines, and parallel Z-shaped lines. FIG. 6 shows the corresponding 3D structures of the three layout patterns after shape approximation is performed. Line end distortions of the parallel L-shaped lines and the parallel Z-shaped lines are flattened to focus on corner rounding. Shape correction results are approximately the same with the ideal drawn layouts since line width variation is well-compensated by OPC and corner rounding happens on smaller portions of the layouts.

The extracted parasitic values with various dimensions are shown in TABLE 1 to TABLE 3 listed above. For the parallel lines of difference line length, relative extraction errors with shape correction range from 1.9% to 1.3% for coupling capacitance and 1.6% to 3% for resistance. With shape approximation, the relative coupling capacitance errors from the post-OPC contour range between 0.9% and 0.2%, and relative resistance errors range between 0.9% and 0.8%. For the parallel L-shaped lines, relative extraction errors of coupling capacitance from the post-OPC contour range between 0.01% and 0.2%, and relative resistance errors range between 1% and 0.4% with shape approximation. For the parallel Z-shaped lines, each pair of two close L-shaped corners is treated together and the resulting 3D structure from shape approximation is shown in FIG. 6. Relative extraction errors of coupling capacitance from the post-OPC contour range between 0.5% and 0.4%, and relative resistance errors range between 1.1% and 0.6% with shape approximation. Overall, shape approximation provides about 3 to 5 times of accuracy improvement in the extraction of coupling capacitance and resistance over shape correction for line end rounding and corner rounding.

B. A Larger Scale Layout with Various Features

Figure 7C:
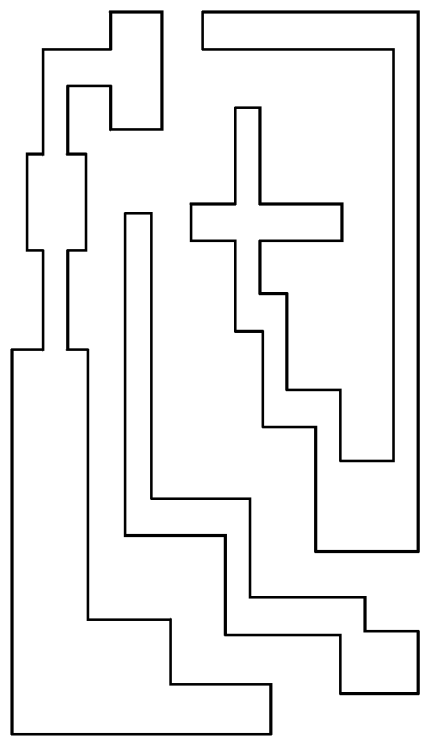
FIGS. 7A-7D are respective top views of: a drawn layout, a post-OPC contour, a shape correction, and a shape approximation of a an example circuit layout.
Figure 7D:
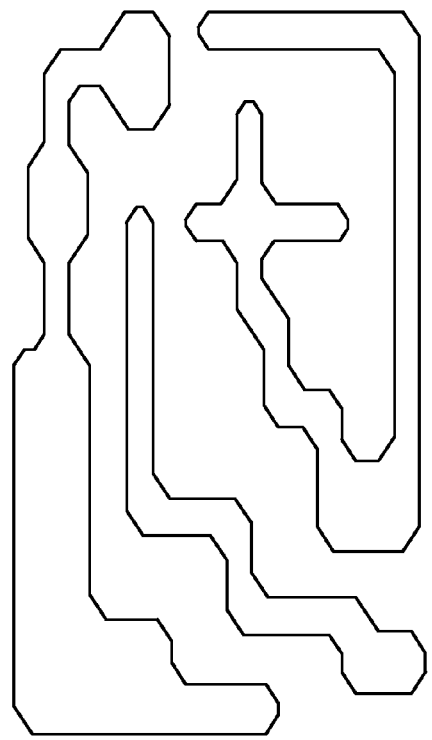
Figure 7A:
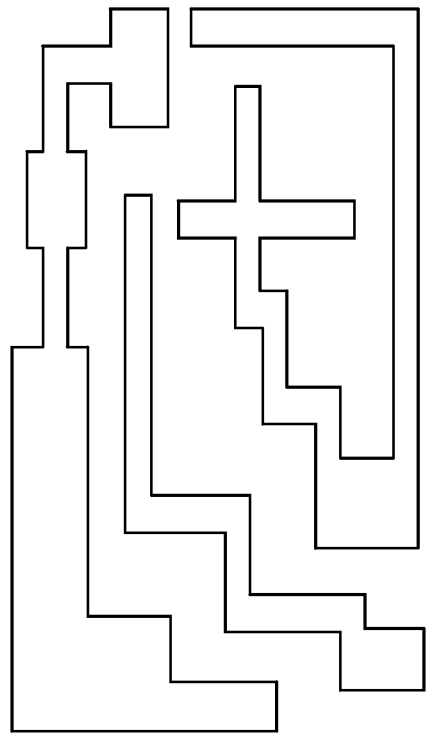
Figure 7B:
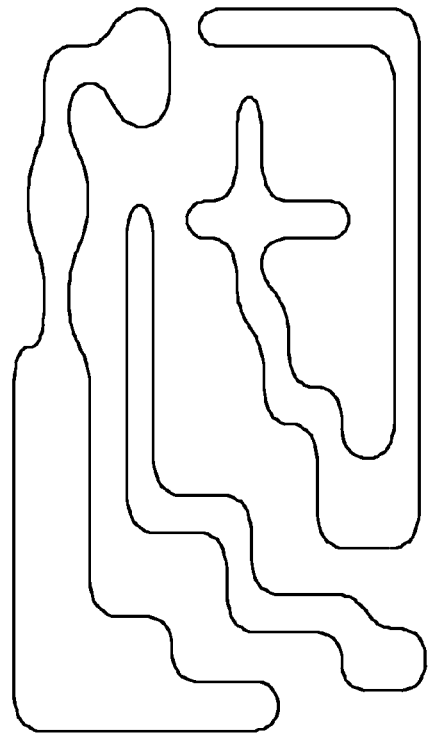

A test pattern of 2.2 µm×1.9 µm in size is designed to include various features to evaluate the combined effects of line end shortening, line end rounding, line width variation, corner rounding, cross-shaped rounding, Z-shaped rounding, and contact rounding. The original drawn layout is shown in FIG. 7A, the post-OPC contour is shown in FIG. 7B, the adjusted layout after shape correction is shown in FIG. 7C, and the adjusted layout after shape approximation is shown in FIG. 7D. The patterns in FIGS. 7A-7D together represent the layout of a very simplified circuit or a simplified full IC chip. Extracted capacitance values are shown in TABLE 4 below. The relative deviation between the ideal drawn layout and the post-OPC contour is more than 2.5%. It can be reduced to below 1.3% by shape correction and below 0.5% by shape approximation. On average, shape approximation can reduce the extraction error by a factor of about 3 from the shape correction method.

TABLE 4

Relative Capacitance Extraction Errors vs. Post-OPC Contour of a 2.2 µm × 1.9 µm Layout

| Pair | Capacitance ($\times 10^{-16}$F) | | | |
|---|---|---|---|---|
| | OPC | Ideal (%) | SC (%) | SA (%) |
| $C_{LM}$ | 0.76 | 2.5 | 0.89 | 0.063 |
| $C_{MR}$ | 0.63 | 2.8 | 1.26 | 0.47 |
| $C_{LR}$ | 0.30 | 3.2 | 1.32 | 0.29 |

VI. SUMMARY AND CONCLUSIONS

Various aspects of the present disclosure offer an efficient model-based RET-aware method for full-chip parasitics extraction, which is compatible with existing tools and flow for practical applications. The overall LPE flow employs full-chip post-RET lithography simulation to accurately quantify sub-wavelength proximity effects, shape approximation to better handle line end rounding and corner rounding distortions, 3D field solvers for pattern library characterization, and LPE techniques for non-Manhattan features to handle SA-corrected layouts. Effectiveness of shape approximation in extraction accuracy improvement has been validated with rigorous numerical simulations. The present disclosure offers a practical and effective approach for the development of a fully model-based electrical-performance-aware design for manufacturability (e-DFM) flow.

Figure 8:
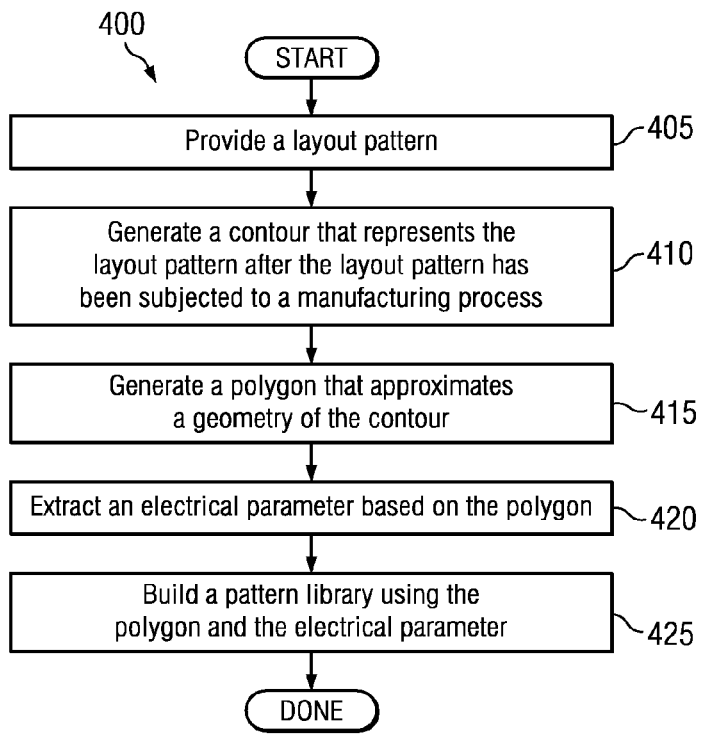
FIGS. 8-10 are each a flowchart illustrating a method of carrying out various aspects of the layout parameter extraction flow of FIG. 3.

One aspect of the present disclosure is illustrated as a method 400, which is shown in FIG. 8. Referring to FIG. 8, the method 400 includes block 405, in which a layout pattern is provided. The method 400 continues with block 410 in which a contour that represents the layout pattern is generated. The layout pattern is the layout pattern after it has been subjected to a manufacturing process. The manufacturing process includes at least one of: a lithography process and an etching process. The contour has at least one curved edge. The method 400 continues with block 415 in which a polygon is generated. The polygon approximates a geometry of the contour by using a plurality of straight edges to approximate curved edges of the contour. In an embodiment, the polygon has a non-Manhattan geometry. The method 400 continues with block 420 in which an electrical parameter is extracted based on the polygon. The block 420 may be carried out using a three-dimensional field solver. The electrical parameter includes at least one of: a parasitic capacitance and a parasitic resistance. The method 400 continues with block 425 in which a pattern library is built using the polygon and the electrical parameter.

Figure 9:
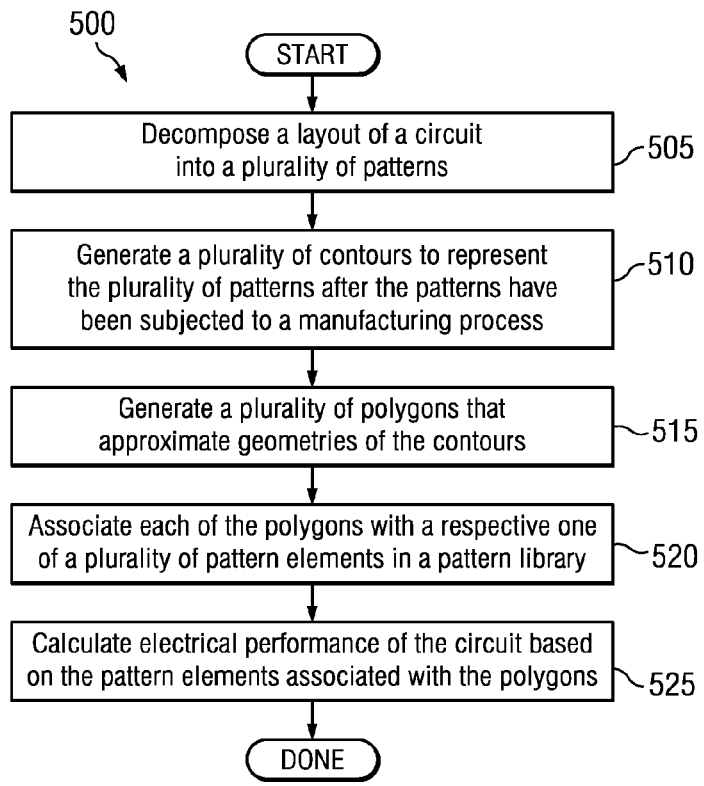

Another aspect of the present disclosure is illustrated as a method 500, which is shown in FIG. 9. Referring to FIG. 9, the method 500 includes block 505, in which a layout of a circuit is decomposed into a plurality of patterns. The method 500 includes block 510, in which a plurality of contours are generated to represent the plurality of patterns after the patterns have been subjected to a manufacturing process. The method 500 includes block 515, in which a plurality of polygons are generated to approximate geometries of the contours. The method 500 includes block 520 in which each of the polygons is associated with a respective one of a plurality of pattern elements in a pattern library. The method 500 includes block 525 in which electrical performance of the circuit is calculated based on the pattern elements associated with the polygons.

Figure 10:
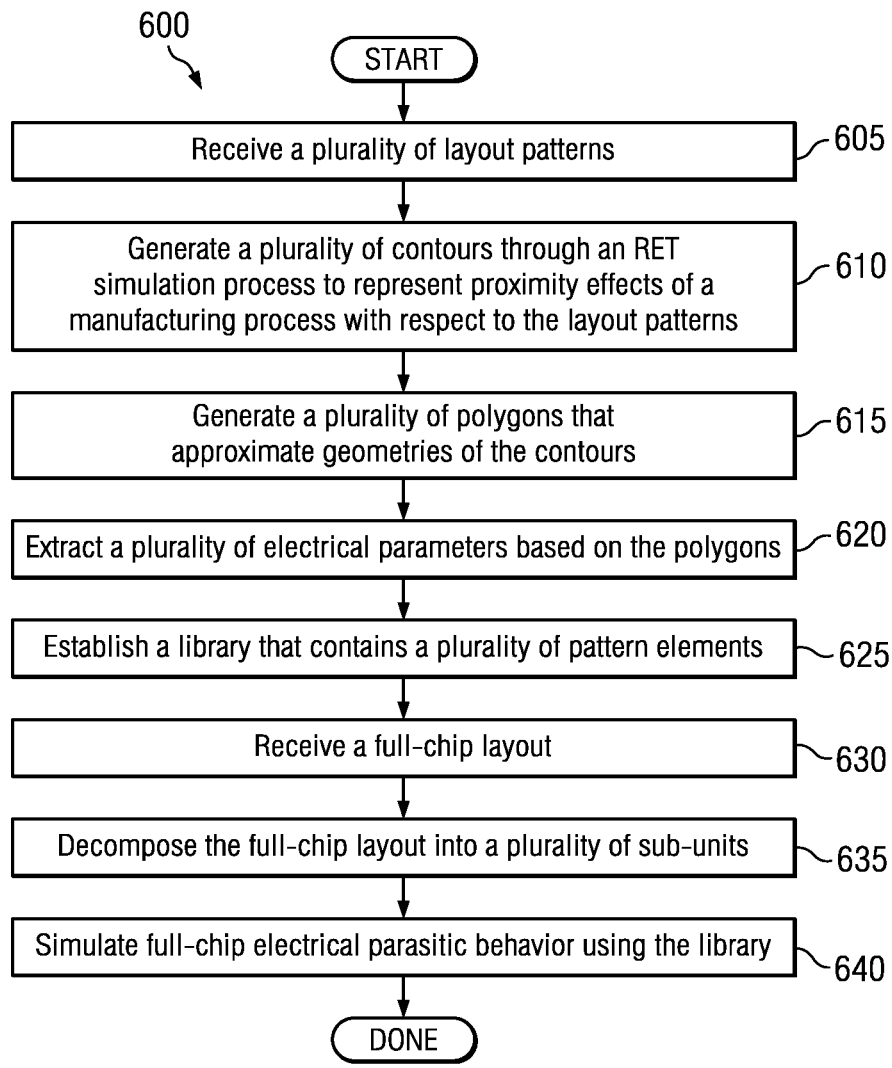

One more aspect of the present disclosure is illustrated as a method 600, which is shown in FIG. 10. Referring to FIG. 10, the method 600 includes block 605, in which a plurality of layout patterns is received. The method 600 continues with block 610, in which a plurality of contours is generated through an RET-aware simulation process to represent proximity effects of a manufacturing process with respect to the layout patterns. The method 600 continues with block 615, in which a plurality of polygons is generated to approximate geometries of the contours, respectively. The method 600 continues with block 620, in which a plurality of electrical parameters is extracted based on the polygons. The method 600 continues with block 625, in which a library is established, wherein the library contains a plurality of pattern elements. Each pattern element corresponds to at least one of the polygons and at least one of the electrical parameters. The method 600 continues with block 630, in which a full-chip layout is received. The method 600 continues with block 635, in which the full-chip layout is decomposed into a plurality of sub-units. The method 600 continues with block 640, in which full-chip electrical parasitic behavior is simulated using the library.

Figure 11:
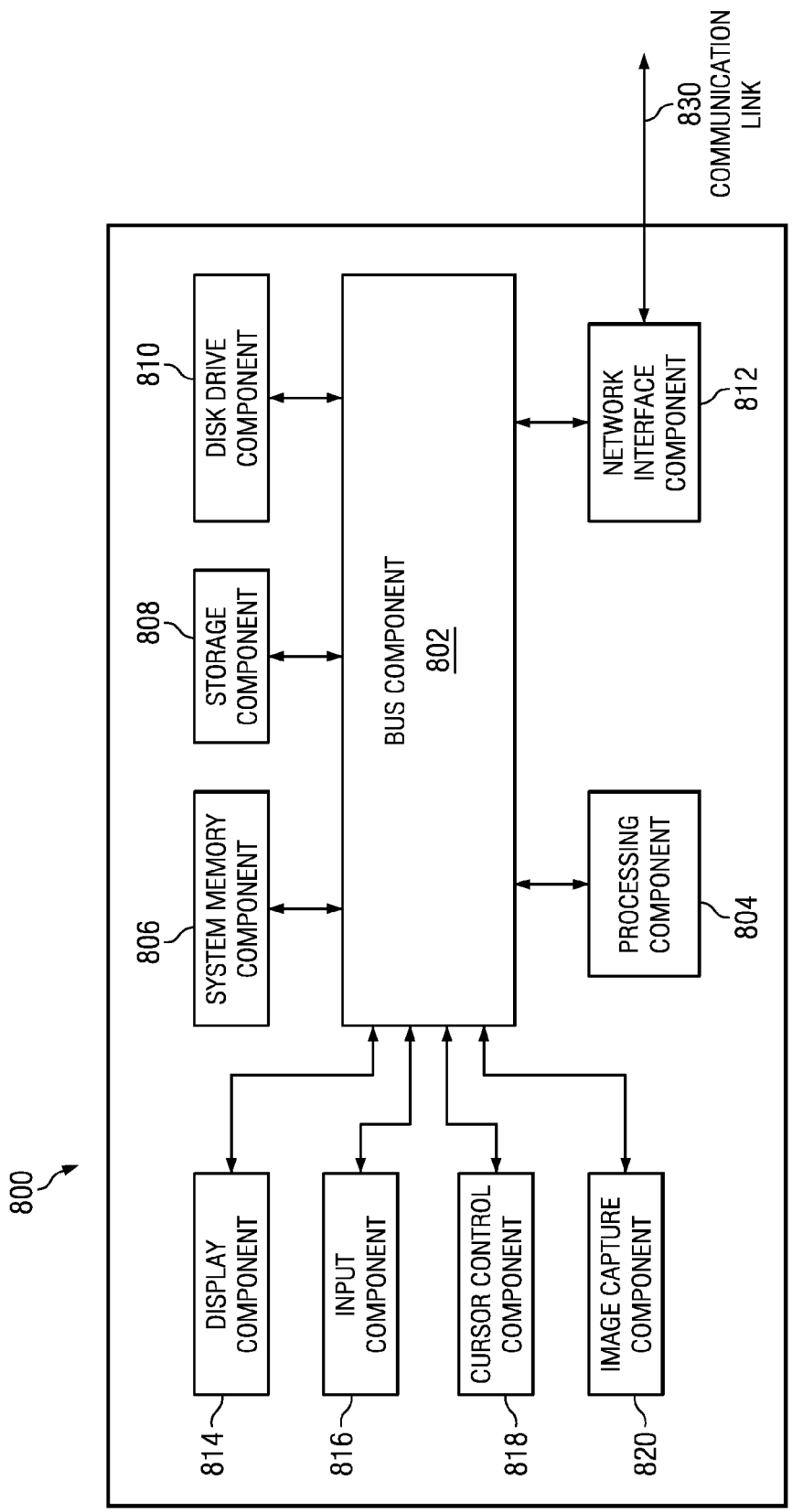
FIG. 11 is a diagrammatic view of a system that is configured to implement the methods of FIGS. 8-10.

FIG. 11 is a block diagram of a computer system 800 suitable for implementing various methods and devices described herein, for example, the various method blocks of the methods 400, 500, and 600 discussed above. In various implementations, the devices of the computer system 800 may comprise a network communications device or a network computing device (e.g., mobile cellular phone, laptop, personal computer, network server etc.) capable of communicating with a network (e.g., an intranet or the Internet). It should be appreciated that each of the devices may be implemented as the computer system 800 for communication with the network in a manner as follows.

In accordance with various embodiments of the present disclosure, the computer system 800, such as a local computer or a networked computer system, includes a bus component 802 or other communication mechanisms for communicating information, which interconnects subsystems and components, such as processing component 804 (e.g., processor, micro-controller, digital signal processor (DSP), etc.), system memory component 806 (e.g., RAM), static storage component 808 (e.g., ROM), disk drive component 810 (e.g., magnetic or optical), network interface component 812 (e.g., modem or Ethernet card), display component 814 (e.g., cathode ray tube (CRT) or liquid crystal display (LCD)), input component 816 (e.g., keyboard), cursor control component 818 (e.g., mouse or trackball), and image capture component 820 (e.g., analog or digital camera). In one implementation, disk drive component 810 may comprise a database having one or more disk drive components.

In accordance with embodiments of the present disclosure, computer system 800 performs specific operations by processor 804 executing one or more sequences of one or more instructions contained in system memory component 806. Such instructions may be read into system memory component 806 from another computer readable medium, such as static storage component 808 or disk drive component 810. In other embodiments, hard-wired circuitry may be used in place of (or in combination with) software instructions to implement the present disclosure.

Logic may be encoded in a computer readable medium, which may refer to any medium that participates in providing instructions to processor 804 for execution. Such a medium may take many forms, including but not limited to, non-volatile media and volatile media. In one embodiment, the computer readable medium is non-transitory. In various implementations, non-volatile media includes optical or magnetic disks, such as disk drive component 810, and volatile media includes dynamic memory, such as system memory component 806. In one aspect, data and information related to execution instructions may be transmitted to computer system 800 via a transmission media, such as in the form of acoustic or light waves, including those generated during radio wave and infrared data communications. In various implementations, transmission media may include coaxial cables, copper wire, and fiber optics, including wires that comprise bus 802.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 800. In various other embodiments of the present disclosure, a plurality of computer systems 800 coupled by communication link 830 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 800 may transmit and receive messages, data, information and instructions, including one or more programs (i.e., application code) through communication link 830 and communication interface 812. Received program code may be executed by processor 804 as received and/or stored in disk drive component 810 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Thus, as discussed above, the various aspects of the present disclosure propose a new LPE method and efficient shape approximation algorithms to account for the shape distortions. Preliminary results verified by field solver simulations indicate that accuracy of parasitics extraction can be significantly improved.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   providing a layout pattern having a first polygon;
   generating a first contour by using a computer, wherein the first contour represents the layout pattern after the layout pattern has been subjected to a first manufacturing process;
   generating a second polygon that approximates a geometry of the first contour;
   extracting an electrical parameter from the second polygon;
   building a pattern library using the second polygon and the electrical parameter;
   after building the pattern library, providing a circuit layout having a third polygon;
   after providing the circuit layout, generating a second contour by using the computer, wherein the second contour represents the circuit layout after the circuit layout has been subjected to second a manufacturing process;
   after generating the second contour, generating a fourth polygon that approximates a geometry of the second contour; and
   after generating the fourth polygon, determining an electrical characteristic of the circuit layout based on comparing the fourth polygon and the second polygon.

2. The method of claim 1, wherein:
the generating the first contour is carried out in a manner such that the first contour includes at least one curved edge; and
the generating the first polygon is carried out in a manner such that the second polygon includes a plurality of straight edges that together approximate the curved edge of the first contour.

3. The method of claim 1, wherein the second polygon has a non-Manhattan geometry.

4. The method of claim 1, further including repeating the providing, the generating the contour, the generating the polygon, the extracting, and the building a plurality of times for a plurality of different patterns to establish the pattern library having a plurality of pattern elements, wherein each pattern element includes at least one polygon and at least one electrical parameter.

5. The method of claim 1, further comprising:
decomposing the circuit layout into a plurality of patterns.

6. The method of claim 1, wherein the extracting the electrical parameter is carried out using a three-dimensional field solver or an actual test structure.

7. The method of claim 1, wherein the extracting the electrical parameter is carried out using test structure measurements.

8. The method of claim 1, wherein:
the electrical parameter includes at least one of: a parasitic capacitance and a parasitic resistance; and
the manufacturing process includes at least one of: a lithography process and an etching process.

9. The method of claim 1, wherein the providing, the generating the first contour, the generating the second polygon, and the building are carried out using the computer.

10. A method, comprising:
providing a layout pattern having a first polygon;
generating a first contour by using a computer, wherein the first contour represents the layout pattern after the layout pattern has been subjected to a first manufacturing process;
generating a second polygon that approximates a geometry of the first contour;
extracting an electrical parameter from the second polygon;
decomposing a layout of a circuit into a plurality of patterns, each pattern having a third polygon;
generating a plurality of second contours to represent the plurality of patterns after the patterns have been subjected to a second manufacturing process;
generating a plurality of fourth polygons that approximate geometries of the second contours, respectively; and
determining an electrical characteristic of the layout of the circuit based on comparing the fourth polygons and the second polygon.

11. The method of claim 10, further including: establishing a pattern library through performing a three-dimensional field solving process for the layout pattern.

12. The method of claim 10, wherein:
the second manufacturing process includes at least one of: a lithography process and an etching process; and
the generating the plurality of fourth polygons is carried out in a manner such that the polygons each have a non-Manhattan geometry.

13. The method of claim 10, wherein the determining the electrical characteristic of the layout of the circuit includes determining parasitic capacitance and parasitic resistance of the circuit.

14. The method of claim 10, wherein the decomposing, the generating the plurality of second contours, the generating the plurality of fourth polygons, and the determining are each carried out using the computer.

15. The method of claim 10, further comprising building a pattern library using the second polygon and the electrical parameter.

16. A method, comprising:
receiving a plurality of layout patterns, each of the layout patterns having a first polygon;
generating a plurality of first contours, by using a computer, through a shape-distortion process simulation to represent proximity effects of a manufacturing process with respect to the plurality of layout patterns;
generating a plurality of second polygons that approximate geometries of the first contours, respectively;
extracting a plurality of electrical parameters based on the second polygons;
establishing a library that contains a plurality of pattern elements, wherein each pattern element corresponds to at least one of the second polygons and at least one of the electrical parameters;
receiving a full-chip layout having a third polygon;
decomposing the full-chip layout into a plurality of sub-units that each correspond to a respective one of the pattern elements in the library;
generating a plurality of second contours through the shape-distortion process simulation to represent proximity effects of the manufacturing process with respect to the plurality of sub units;
generating a plurality of fourth polygons that approximate geometries of the second contours, respectively; and
determining an electrical characteristic of the full-chip layout based on comparing the fourth polygons and the second polygons.

17. The method of claim 16, wherein the generating the plurality of first contours is carried out in a manner such that:
the first contours include curved sides; and
the manufacturing process includes at least one of: a lithography process and an etching process.

18. The method of claim 16, wherein:
the generating the plurality of second polygons is carried out in a manner such that the polygons have non-Manhattan shapes; and
the extracting the plurality of electrical parameters includes solving Maxwell's equations based on three-dimensional geometries of the second polygons.

19. The method of claim 16, wherein the extracting the plurality of electrical parameters is carried out using test structure measurements.

* * * * *